United States Patent Office 2,759,836
Patented Aug. 21, 1956

2,759,836

PLASTICIZED SHEET OF CELLULOSE TRIACETATE

John R. Caldwell, Kingsport, Tenn., assignor to Eastman Kodak Company, Rochester, N. Y., a corporation of New Jersey No Drawing. Application April 15, 1952, Serial No. 282,462

1 Claim. (Cl. 106—181)

This invention relates to compositions of matter in which cellulose triacetate is mixed with a plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, molding compounds and products, artificial silk, varnishes or lacquers, coating compositions and the like.

The object of this invention is compositions of matter comprising cellulose triacetate and a $C_1$—$C_4$ dialkyl 1-4 endomethylene hexahydro 2-3 phthalate made into permanently transparent, strong and flexible sheets or films of desired thinness which are substantially waterproof, are unaffected by ordinary photographic fluids and possess the desired properties of a support for sensitive photographic coatings.

I have discovered that valuable properties may be induced in and/or contributed to compositions containing cellulose acetate by adding thereto, as a plasticizing compound, a dialkyl ester of 1,4-endomethylene hexahydro-2,3-phthalic acid, in which each alkyl group contains from 1 to 4 carbon atoms, inclusive. I may use dimethyl, diethyl, dipropyl, or dibutyl esters, or mixed esters containing two different ones of these lower alkyl radicals. These esters have the structural formula

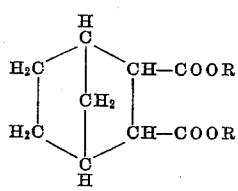

1,4-endomethylene hexahydrophthalic acid may be obtained by the hydrogenation of the endomethylene tetrahydrophthalic acid which is formed by the addition of cyclopentadiene and maleic anhydride as described in Diels and Alder U. S. Patent No. 1,944,731. Esterification of the endomethylene hexahydrophthalic acid with monohydric saturated aliphatic alcohols containing from 1 to 4 carbon atoms may be carried out by heating the acid with the alcohol in a conventional manner. If desired, this may be done in the presence of a suitable catalyst, such as sulfuric acid. The water formed during esterification may be removed continuously as an azeotropic mixture by distillation with benzene, xylene, or toluene.

The lower alkyl esters of endomethylene hexahydrophthalic acid may also be formed by hydrogenation of the corresponding esters of endo-methylene tetrahydrophthalic acid.

The lower alkyl esters of endomethylene hexahydrophthalic acid are insoluble in water and have relatively low vapor pressures. These properties contribute to good retention of the plasticizer in the cellulose acetate compositions.

Not only are my novel plasticizers useful with the ordinary, acetone-soluble, partially hydrolyzed cellulose acetate, containing about 38–40% acetyl, but they are also useful as plasticizers for the so-called cellulose triacetate, which contains about 43% or more of combined acetyl. It is well known that cellulose triacetate has solubility properties very different from those of partially hydrolyzed cellulose acetate. A number of volatile solvents for cellulose triacetate are known in the art, for instance, those shown in U. S. Patents 2,492,977 and 2,492,978, of Fordyce and Gramkee. While a large number of plasticizers are known for acetone-soluble cellulose acetate, very few satisfactory plasticizers are known for cellulose triacetate.

In order that those skilled in this art may better understand my invention I would state, by way of illustration, that for the manufacture of photographic film base or other sheets my new compositions of matter may be compounded as follows: 100 parts by weight of cellulose acetate is dissolved in any suitable solvent for the type of cellulose acetate being used, and from 15 to 70 parts by weight, preferably 25 to 50 parts by weight, of a lower dialkyl ester of 1,4-endomethylene hexahydro-2,3-phthalic acid is incorporated in the solution. Within the limits stated, the amount of plasticizer may be decreased or increased, depending upon whether it is desired to decrease or increase, respectively, the properties which these plasticizers contribute to the finished product. The amount of volatile solvent employed may also be varied in accordance with the consistency of the composition desired. The cellulose acetate used may be either the acetone-soluble variety, or cellulose triacetate.

A composition of matter prepared as above described may be deposited upon any suitable film-forming surface and the solvent evaporated therefrom to form a film or sheet, in a manner well known to those skilled in the art. A film so produced has permanently brilliant transparency and low flammability. Films or sheets produced in accordance with my invention are very tough and flexible, and maintain flexibility in a superior fashion.

My novel plasticizers may also be advantageously used in molding compositions of the acetone-soluble type of cellulose acetate. For instance, about 25 to 100 parts of the plasticizer, depending on the hardness or softness of the plastic desired, may be homogeneously mixed with 100 parts of cellulose acetate, for instance by working on hot rolls, and the mixture converted into a transparent or translucent plastic product by molding at a temperature of 140–160° C. and a pressure of 2500 to 4000 pounds per square inch for a period of from 2 to 5 minutes, in a manner well known to those skilled in molding compounds of that nature. The softer plastics may be extruded through a die, or injection molded. Pigments, antioxidants, mold lubricants, etc. may be included in the composition if desired.

What I claim as my invention and desire to be secured by Letters Patent of the United States is:

A transparent, flexible sheet comprising cellulose triacetate and, as a plasticizer therefor, a dialkyl ester of 1,4-endomethylene hexahydro-2,3-phthalic acid in which each alkyl group contains from 1 to 4 carbon atoms.

References Cited in the file of this patent

UNITED STATES PATENTS

| | | |
|---|---|---|
| 900,204 | Raschig | Oct. 6, 1908 |
| 1,905,516 | Smith | Apr. 25, 1933 |
| 2,275,384 | Soday | Mar. 3, 1942 |

OTHER REFERENCES

Simonds and Ellis, "Handbook of Plastics" (1943), pp. 254 to 269.